US012011139B2

(12) United States Patent
Bone (10) Patent No.: US 12,011,139 B2
(45) Date of Patent: Jun. 18, 2024

(54) ROBOTIC DEVICE WITH ENERGY STORAGE DEVICE (71) Applicant: Black & Decker, Inc., New Britain, CT (US)

(72) Inventor: Graham Bone, Carrville Durham (GB)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/112,838

(22) Filed: Feb. 22, 2023

(65) Prior Publication Data

US 2023/0190060 A1 Jun. 22, 2023

Related U.S. Application Data (63) Continuation of application No. 16/650,574, filed as application No. PCT/GB2018/052685 on Sep. 20, 2018, now Pat. No. 11,602,253.

(30) Foreign Application Priority Data

Sep. 28, 2017 (GB) ...................................... 1715690

(51) Int. Cl.
A47L 9/28 (2006.01)
A47L 9/00 (2006.01)
A47L 11/28 (2006.01)
A47L 11/40 (2006.01)

(52) U.S. Cl.
CPC ............. A47L 9/2805 (2013.01); A47L 9/009 (2013.01); A47L 9/2852 (2013.01); A47L 9/2894 (2013.01); A47L 11/28 (2013.01); A47L 11/4005 (2013.01); A47L 11/4011 (2013.01); A47L 11/4061 (2013.01); (Continued)

(58) Field of Classification Search
CPC .. A47L 11/28; A47L 11/4005; A47L 11/4011; A47L 11/4061; A47L 11/4091; A47L 2201/022; A47L 2201/04; A47L 9/009; A47L 9/2805; A47L 9/2852; A47L 9/2894
See application file for complete search history.

(56) References Cited

U.S. PATENT DOCUMENTS

2008/0133054 A1* 6/2008 Kim ...................... A47L 9/2852
901/1
2017/0072564 A1* 3/2017 Cohen ............... H02J 7/007182
2017/0217019 A1* 8/2017 Cohen ............... H02J 7/007182
(Continued)

FOREIGN PATENT DOCUMENTS

EP 2273336 A2 * 1/2011 ........... A47L 9/0063

Primary Examiner — Marc Carlson
(74) Attorney, Agent, or Firm — John Yun (57) ABSTRACT A robotic device comprising: an energy storage device; and a controller configured to determine whether a quantity of energy stored in the energy storage device is below a predetermined energy level, wherein: the robotic device is configured to perform a cleaning task if the determined quantity of energy is not below the predetermined energy level; if the determined quantity of energy is below the predetermined energy level: the controller is configured to estimate a likelihood of the robotic device being capable of locating a recharging base station; and in dependence on the estimated likelihood, the robotic device is configured to seek the recharging base station or perform the cleaning task.

7 Claims, 5 Drawing Sheets (52) U.S. Cl.
CPC ..... *A47L 11/4091* (2013.01); *A47L 2201/022* (2013.01); *A47L 2201/04* (2013.01)

(56) References Cited

U.S. PATENT DOCUMENTS

| | | | |
|---|---|---|---|
| 2019/0254490 A1* | 8/2019 | Marutani | G05D 1/0274 |
| 2020/0229668 A1* | 7/2020 | Bone | A47L 11/4061 |

* cited by examiner

ROBOTIC DEVICE WITH ENERGY STORAGE DEVICE

The present application is a continuation application of U.S. application Ser. No. 16/650,574 filed Mar. 25, 2020 which claims priority to international PCT Application Serial No. PCT/GB2018/052685 filed Sep. 20, 2018 which claims priority to GB patent application number 1715690.2 filed Sep. 28, 2017 which is hereby incorporated by reference for all purposes as if fully set forth herein.

BACKGROUND OF THE INVENTION

This invention relates to robotic systems and, in particular, efficient energy management for autonomous robotic devices.

Autonomous robots are robots which can perform desired tasks in unstructured environments without continuous human guidance. Many kinds of robots are autonomous to some degree. Different robots can be autonomous in different ways. Typically, an autonomous robot traverses a work surface without continuous human guidance to perform one or more tasks. In the field of home, office and/or consumer-oriented robotics, mobile robots that perform household functions such as vacuum cleaning, floor washing, lawn cutting and other such tasks have been widely adopted.

The autonomous robotic devices are usually battery powered and thus the battery life of the robot affects the robot's ability to perform its task. Usually, the battery of an autonomous robotic device is recharged at a base or docking station. The types of recharging stations and methods used by robots in finding or docking with them (e.g., radio signals, dead reckoning, ultrasonic beams, infrared beams coupled with radio signals, etc.) vary greatly in both effectiveness and application. A robotic device can autonomously find and dock with a recharging station to recharge its batteries and then continue performing its task without human intervention. However, issues and inefficiencies arise when the robot is unable to find a recharging station.

SUMMARY OF THE INVENTION

According to a first aspect there is provided a robotic device comprising: an energy storage device; and a controller configured to determine whether a quantity of energy stored in the energy storage device is below a predetermined energy level, wherein: the robotic device is configured to perform a cleaning task if the determined quantity of energy is not below the predetermined energy level; if the determined quantity of energy is below the predetermined energy level: the controller is configured to estimate a likelihood of the robotic device being capable of locating a recharging base station; and in dependence on the estimated likelihood, the robotic device is configured to seek the recharging base station or perform the cleaning task.

The robotic device may be configured to seek the recharging base station without performing the cleaning task.

When the determined quantity of energy is below the predetermined energy level, the robotic device may be configured to perform the cleaning task without actively seeking the recharging base station.

When the determined quantity of energy is below the predetermined energy level, the robotic device may be configured to perform the cleaning task while passively seeking the recharging base station.

The robotic device may be configured to seek the recharging base station if the estimated likelihood is high or the robotic device is configured to perform the cleaning task if the likelihood is low.

The controller may be configured to estimate said likelihood in dependence on whether or not the robotic device is activated from the recharging base station.

The controller may be configured to estimate said likelihood in dependence on a number of occasions the robotic device detects the recharging base station.

The controller may be configured to determine an amount of time since the robotic device detected the recharging base station, the controller being configured to estimate said likelihood in dependence on the determined amount of time.

The controller may be configured to determine a distance travelled since the robotic device detected the recharging base station, the controller being configured to estimate said likelihood in dependence on the determined distance.

The robotic device may further comprise a wireless communications device, wherein, when the robotic device is coupled with the recharging base station, the wireless communication device may be configured to determine an identifier of other wireless communications devices within communications range, the controller being configured to store the identifier(s).

When the robotic device is uncoupled from the recharging base station, the wireless communication device may be configured to determine a further identifier of other wireless communications devices within communications range, the controller being configured to compare said further identifier(s) with said stored identifier(s).

The controller may be configured to estimate said likelihood in dependence on said comparison.

The controller may be configured to estimate said likelihood by calculating a probability that the robotic device will locate the recharging base station and compare said probability to a predetermined threshold probability.

The cleaning task may be vacuuming, wiping, mopping, scrubbing and/or sanitising.

The robotic device may be configured to seek the recharging base station or perform the cleaning task without following a predetermined route or without performing route mapping.

When the robotic device is seeking the recharging base station or performing the cleaning task, the robotic device may be configured to travel in random directions.

When the robotic device performs said cleaning task in dependence on the estimated likelihood, the robotic device may be configured to perform said cleaning task until the energy level of the energy storage device reaches a predetermined critical energy level, wherein the robotic device may be configured to cease performing the cleaning task when the energy level of the energy storage device reaches the predetermined critical energy level.

According to a second aspect there is provided a robotic device comprising: an energy storage device; one or more charging contacts for receiving energy from a base station; a controller configured to determine whether the one or more charging contacts are receiving energy from the base station; wherein: if the one or more charging contacts are not receiving energy from the base station: the controller is configured to estimate a likelihood of the base station being capable of providing energy to the one or more charging contacts; and in dependence on the estimated likelihood, the robotic device is configured to seek the recharging base station or not seek the recharging base station.

The robotic device may further comprise a sensor configured to detect signals from the base station, wherein the controller may be configured to estimate said likelihood in dependence on whether or not the sensor detects signals from the base station.

The robotic device may further comprising a cliff-edge sensor or wheel drop sensor, wherein the controller may be configured to estimate said likelihood in dependence on a signal from the cliff-edge sensor or wheel drop sensor.

The robotic device may further comprise a wireless communications device, wherein the controller may be configured to estimate said likelihood in dependence on whether or not the wireless communications device detects the base station or an access point.

The robotic device may be configured to not seek the base station if the estimated likelihood is low.

According to a third aspect there is provided a method for a robotic device comprising an energy storage device, the method comprising: determining whether a quantity of energy stored in the energy storage device is below a predetermined energy level; performing a cleaning task if the determined quantity of energy is not below the predetermined energy level; if the determined quantity of energy is below the predetermined energy level: estimating a likelihood of the robotic device being capable of locating a recharging base station; and in dependence on the estimated likelihood, seeking the recharging base station or performing the cleaning task.

According to a fourth aspect there is provided a method for a robotic device comprising an energy storage device and one or more charging contacts for receiving energy from a base station, the method comprising: determining whether the one or more charging contacts are receiving energy from the base station; if the one or more charging contacts are not receiving energy from the base station: estimating a likelihood of the base station being capable of providing energy to the one or more charging contacts; and in dependence on the estimated likelihood, seeking the recharging base station or not seeking the recharging base station.

There may be provided computer program code for performing a method as described herein. There may be provided non-transitory computer readable storage medium having stored thereon computer readable instructions that, when executed at a processor, cause a robotic device comprising the processor to perform the methods as described herein.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

The present invention relates to the efficient use of battery power for a robotic device such as a robotic vacuum cleaner. Although the following describes the invention in relation to a robotic vacuum cleaner, the invention could be implemented for other types of autonomous robotic devices such as robotic lawn mowers and other floor cleaning robots that perform one or more of vacuuming, wiping, mopping, scrubbing, sanitising and the like.

In some conventional robotic vacuum cleaners, when the battery power is low, the robot enters a low power mode in which vacuuming is stopped and the robot actively seeks a base station so that it can recharge. However, if the robot fails to find the base station, its battery will have been drained simply looking for the base station. In some scenarios, this is a waste of energy. For example, if there is no base station in the operating area or zone, the robot will have wasted that remaining energy looking for a non-existent base station. In one example, the present invention solves this problem by first determining a likelihood of the robot being able to find a base station. For example, the likelihood may be a probability of a base station being in the operating area based on the robot's observations whilst it has been switched on. If the likelihood is low and the energy level drops below a certain threshold, then the robot may maintain its cleaning task without actively seeking the base station and until its battery is mostly drained (a small amount of power may be maintained in order to alert the user). This has the advantage of usefully using the remaining low energy of the robot for cleaning instead of wasting that energy looking for a base station that is unlikely to be in the operating area. If the likelihood is high however, then the robot may stop vacuuming and actively seek the dock as it has a better chance of finding the dock to recharge and then resume cleaning.

Figure 1:
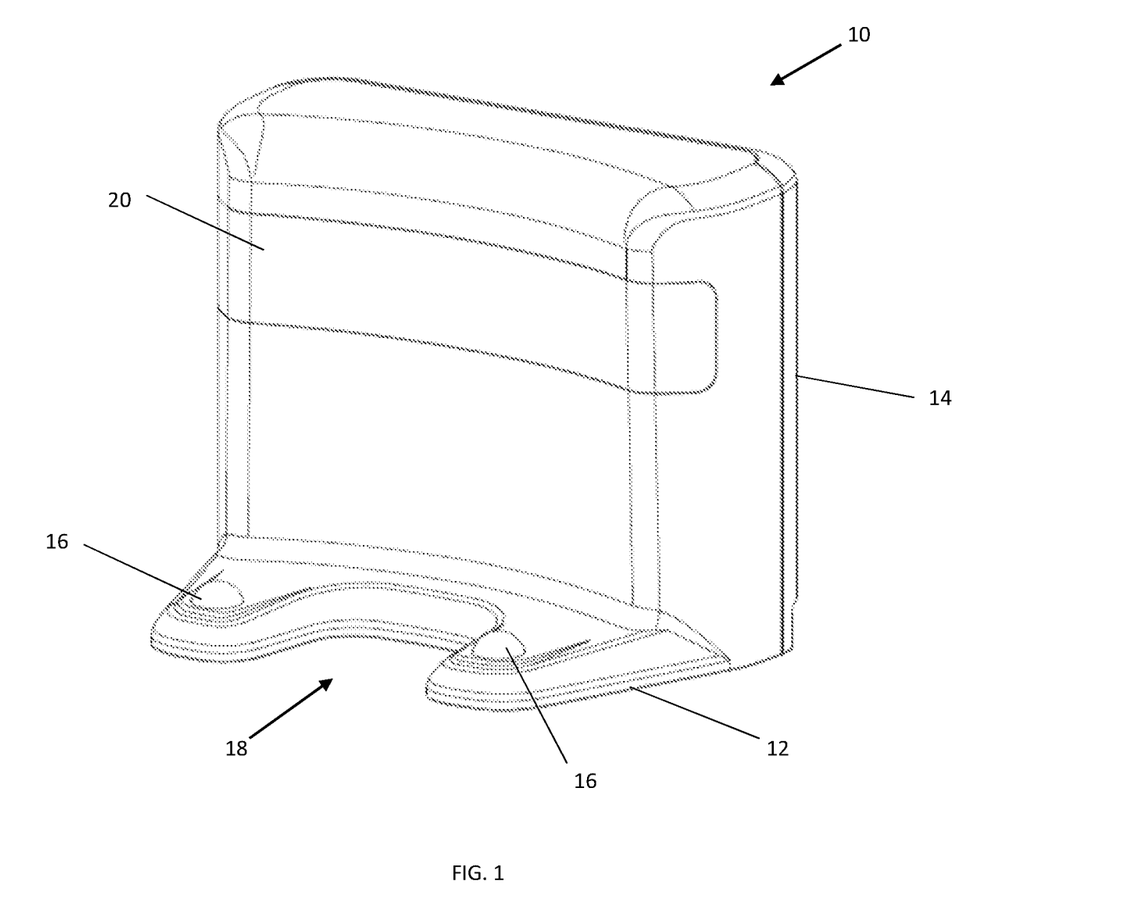
FIG. 1 shows an example of a base station.

FIG. 1 is a schematic perspective view of an example recharging base station 10. The base station 10 may include a substantially horizontal base 12 and a substantially vertical backstop 14. The base station 10 may be any of a variety of shapes or sizes, providing sufficient space for the desired components and systems, described below. The base 12 is generally parallel to the ground surface on which the base station 10 rests, but may have a slight upwards angle directed toward the backstop 14. By minimizing the angle of rise of the base 12, the robotic device may easily dock with the station 10. Electrical charging contacts 16 are located on a top surface of the base 12, allowing them to contact corresponding contacts on the underside of the robotic device. The contacts 16 or the contacts on the robot may be either fixed or compliant. In the depicted example, two contacts 16 are utilised to electrically couple the base station 10 and the robotic device when the robotic device docks with the base station 10. In other examples, however, a single contact or more than two contacts may be utilised. Other example base stations may use the charging contacts to charge the battery and additional contacts to transmit data and information between the base station and robot.

The contacts 16 may be sized and positioned to reliably and repeatably contact the corresponding contacts on the robot. For example, the contacts 16 may be oversized and/or may extend above the base 12, e.g., in a domed shape, to ensure contact with the robot contacts. Alternatively, the contacts may be flush-mounted on a base with a higher angle of rise or may protrude above a base that is flat or has substantially no rise. Depending on the application, the base 12 angle of rise may vary from 0° to up to 20° and greater. The example base station 10 depicted in FIG. 1 also includes a void 18 in the base 12, between the two contacts 16, which provides space for the caster of the robot to move into. The void 18, in combination with the configuration of the charging contacts 16, ensures proper alignment and registration between the charging contacts on both the base station 10 and the robot.

The backstop 14 may provide locations for the components of the base station 10. Specifically, in the depicted example, the backstop 14 includes a front signal transmitter and/or receiver array 20 and an AC mains plug receptacle (not shown). The backstop 14 may also house one or more communications devices (not shown) therein. The communications devices may be for communicating with the robot, which may comprise a corresponding communications device. The communications devices of the base station 10 may also communicate with other devices such as smartphones, a network device (e.g., an Access Point), smart devices, etc. The communications devices may be capable of communicating using known wireless methods such as RF (2.4 Ghz), WiFi, Bluetooth, LTE, 5G or any other suitable communications technology.

Figure 2A:
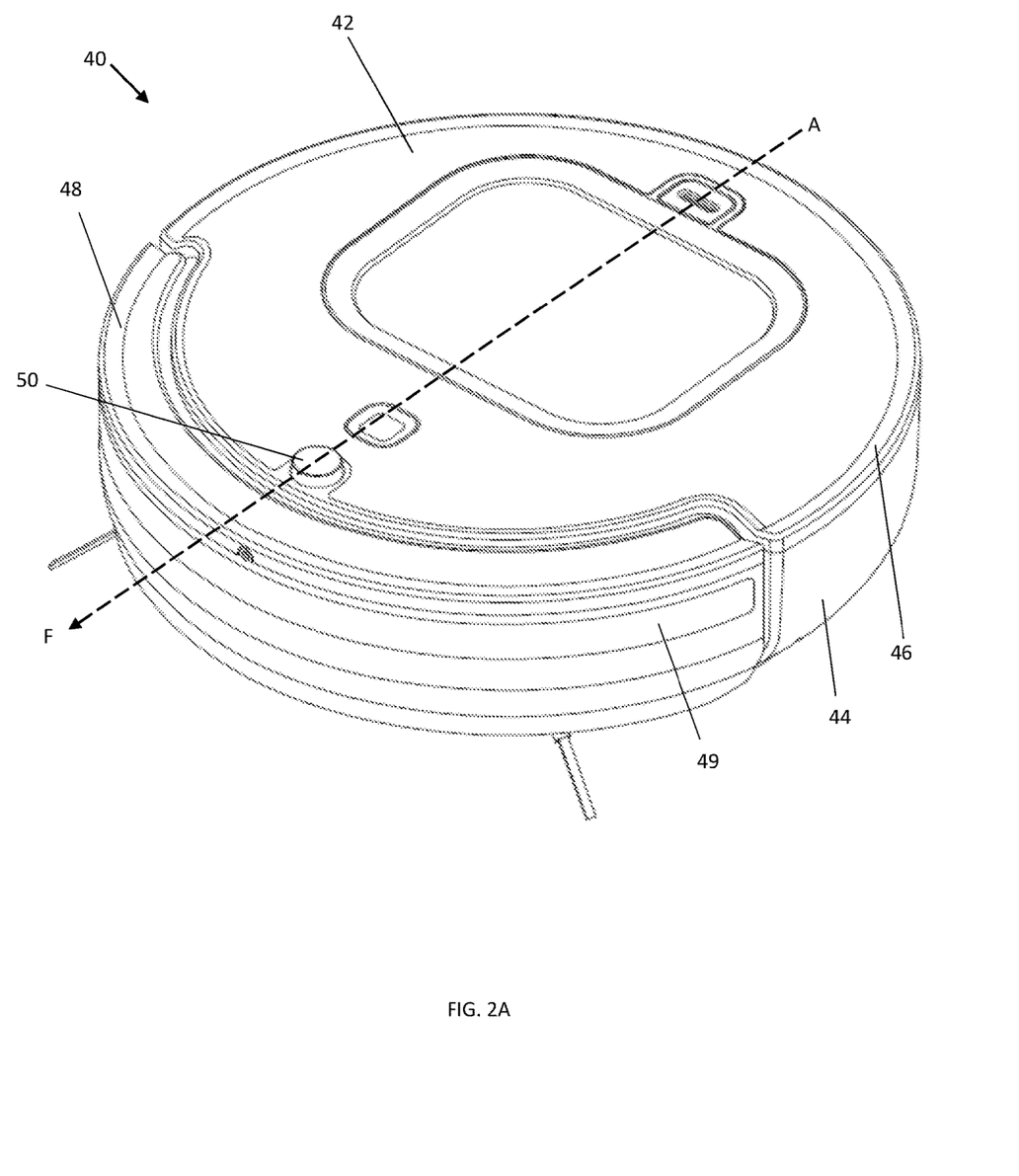
FIG. 2A shows an example of a robotic device.
Figure 2B:
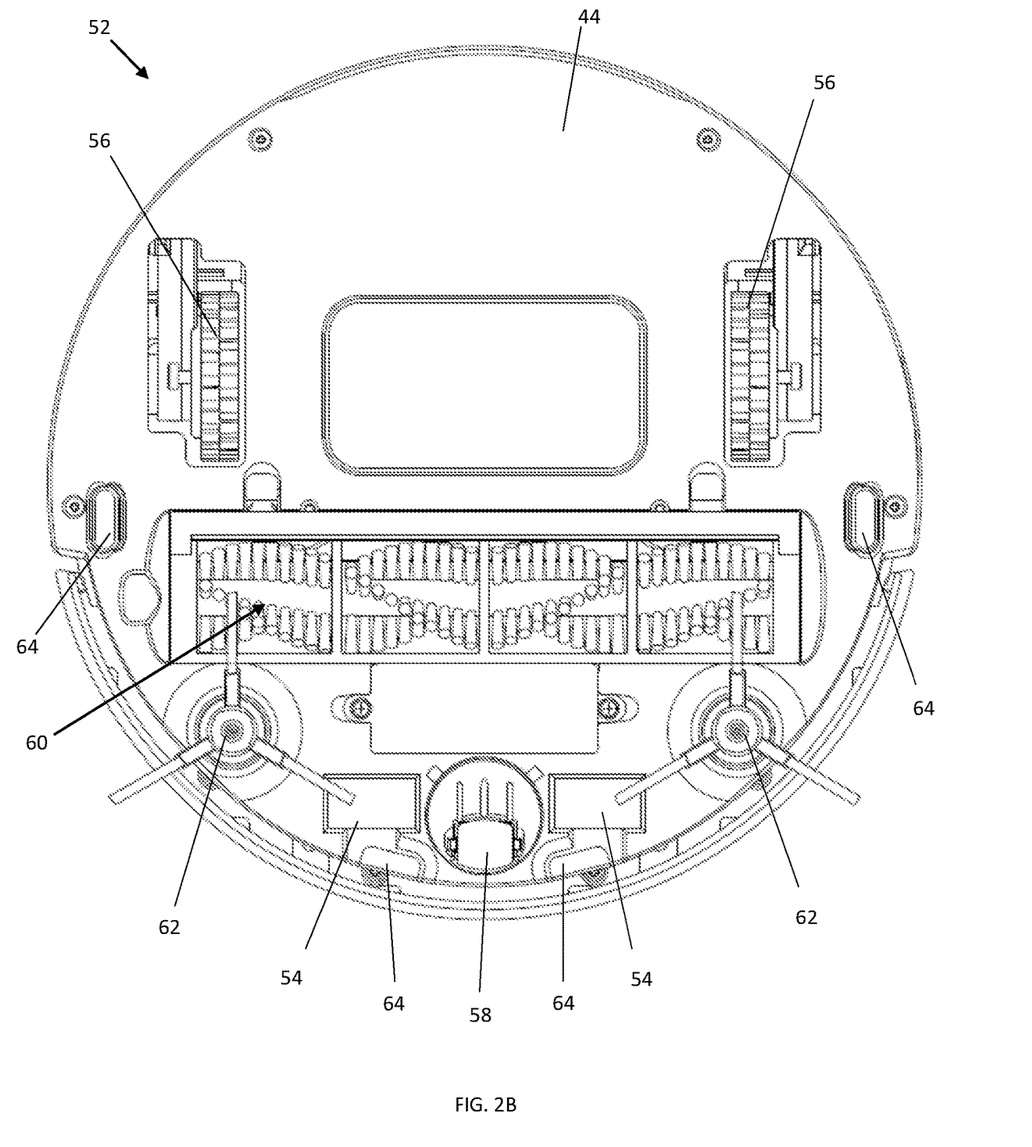
FIG. 2B shows a bottom view of the robotic device.

FIGS. 2A and 2B are schematic views of an example autonomous robotic device 40 that is adapted to dock/mate with the base station 10. In the following description of the autonomous robot 40, use of the terminology "forward/fore" refers generally to the primary direction of motion of the robot 40, and the terminology fore-aft axis (see reference characters "FA" in FIG. 2A) defines the forward direction of motion (indicated by arrowhead of the fore-aft axis FA), which is coincident with the fore-aft diameter of the robot 40.

In the example depicted, the housing 42 of the robot 40 includes a chassis 44, a cover 46, and a displaceable bumper 48. The chassis 44 may be moulded from a material such as plastic as a unitary element that includes a plurality of preformed wells, recesses, and structural members for, inter alia, mounting or integrating elements of the various subsystems that operate the robotic device 40. Such subsystems may include a controller, a power subsystem (including one or more power sources for the various subsystems and components), a motive subsystem, a sensor subsystem, and task-specific component subsystems. The cover 46 may be moulded from a material such as plastic as a unitary element that is complementary in configuration with the chassis 44 and provides protection of and access to elements and components mounted to the chassis 44. The chassis 44 and the cover 46 may be detachably integrated in combination by any suitable means (e.g., screws), and in combination, the chassis 44 and cover 46 form a structural envelope of minimal height having a generally cylindrical configuration that is generally symmetrical along the fore-aft axis FA.

The displaceable bumper 48, which may have a generally arcuate configuration, is mounted in movable combination at the forward portion of the chassis 44 to extend outwardly therefrom (the "normal operating position"). The mounting configuration of the displaceable bumper 48 is such that it is displaced towards the chassis 44 (from the normal operating position) whenever the bumper 48 encounters a stationary object or obstacle of predetermined mass (the "displaced position"), and returns to the normal operating position when contact with the stationary object or obstacle is terminated (which may be due to operation of a control sequence which, in response to any such displacement of the bumper 48, causes the robot 40 to evade the stationary object or obstacle and continue its task routine).

Mounted on the robotic device 40 is a docking guide 50 which may be a transmitter and/or receiver that is capable of communicating with the front array 20 of the base station 10 to enable docking with the base station 10. In an example, the docking guide 50 may be an infrared (IR) transmitter and the front array 20 is a plurality of IR detectors that are spaced along and behind an IR window 20. The IR transmitter 50 transmits an IR signal, which may be detected by one or more of the IR detectors in the array 20. In the example of an IR transmitter/receiver arrangement, the IR transmitter 50 needs to be in the line-of-sight of at least one of the IR detectors in the array 20 in order to be detected. Depending on the signal strength of the transmitted signal received at each IR detector in the array, the base station 10 is able to calculate the position of the robot 40 relative to the base station 10. For example, if the left-most IR detector in the array receives a higher signal strength than the right-most IR detector, then the base station 10 can infer that the front of the robot 40 is positioned closer to the left-most IR detector than the right-most IR detector in the array 20. If the left-most and right-most IR detectors of the array 20 detect substantially the same signal strength, then the base station 10 may infer that the front of the robot 40 is directed towards the middle of the base station 10, and thus heading in the correct direction in order to dock correctly. In another example, the IR detectors in the array may be directional such that each of the detectors only receive IR signals that originate from a specified range of directions, thus allowing the base station 10 to determine the position of the robot 40. For example, the array may comprise left-side, central and right-side IR detectors, where the left-side detector is configured to receive signals originating from that side only, the central detector is configured to receive signals originating from in front of the array only and the right-side detector is configured to receive signals from that side only. Such directional IR receivers are well-known in the art. The base station 10 may communicate the position information to the robot 40, which may then adjust its position in response to align itself correctly in order to dock with the base station 10. The base station 10 and robot 40 may communicate such position information via an RF communications link or any other suitable communications method, as mentioned above.

Other docking methods may be used. For example, the above process may be reversed and the docking guide 50 on the robot may be an IR detector that receives signals from an array of IR emitters 20 on the base station 10. Each of the IR emitters on the base station 10 may transmit information in its signal that enables the robot 40 to determine which side of the array 20 each received signal is being emitted from and, using the received signal strength from each of those IR emitters, determine its position relative to the base station 10. Thus, in this example, the robot 40 may directly be able to determine its position relative to the base station 10 without having to utilise the RF link.

Referring now to FIG. 2B, the undercarriage of the robotic device 40 is indicated generally by numeral 52. One or more charging contacts 54 are present in the undercarriage 52, configured in such a location to correspond with the location of the electrical contacts 16 of the base station 10 so that the charging contacts 54 of the robotic device 40 can make electrical contact with contacts 16 of the base station 10. Generally, the charging contacts 54 on the robotic device mirror those present on the base station 10, regardless of their location or orientation. In certain embodiments, the charging contacts 54 may be larger on either the base station 10 or robot 40, to allow wider compliance in making contact. Also, the motive and task specific components of the robot 40 are located in the undercarriage 52. The motive components may include any combination of motors, wheels 56, drive shafts, or tracks as desired, based on cost or intended application of the robot 40, all of which are well known in the art. The motive components may include at least one caster 58 which, in this embodiment, fits into the void 18 on the base plate 12. As shown in FIG. 2B, the robot 40 in the present example comprises a vacuum opening with a driven beater bar 60 and rotating side brushes 62 for performing the vacuuming task (other components for performing the vacuuming task such as the motor/fan arrangement and dirt separation method are not shown for simplicity).

As mentioned above, the robotic device may be suited a number of different tasks and so the robotic device may comprise other more suitable components to perform those tasks. For example, the robotic device may be used for floor waxing and polishing, floor scrubbing, sweeping, mopping, sanding and stain/paint application, ice melting and snow removal, grass cutting, etc. Any number of components may be required for such tasks, and may each be incorporated into the robotic device, as necessary. For simplicity and as mentioned above, this application describes vacuuming as the demonstrative predetermined task. It will be apparent, though, that the energy management and docking functions disclosed herein have a wide application across a variety of robotic systems that may perform other tasks.

Figure 3:
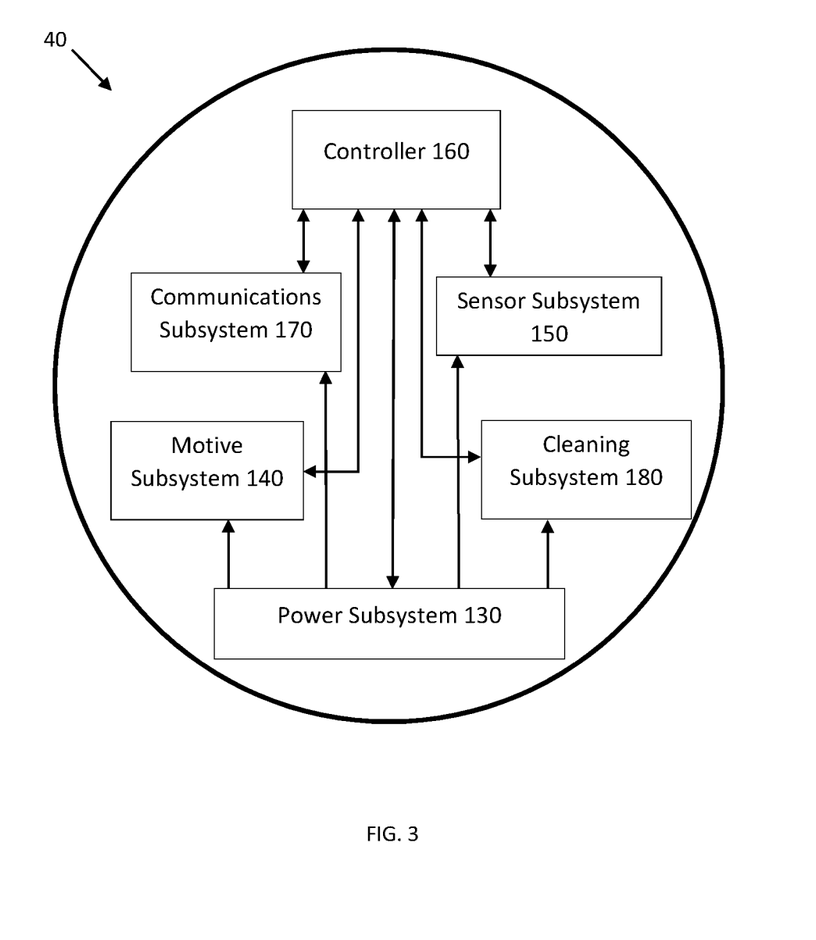
FIG. 3 shows an example schematic for the robotic device.

FIG. 3 is a schematic representation of the internal components of the autonomous floor-cleaning robot 40. The robot 40 comprises a power subsystem 130 (e.g., a battery), a motive subsystem 140, a sensor subsystem 150, a controller 160, a communications subsystem 170 and a task-specific subsystem, which in this example is a cleaning subsystem 180. The power subsystem 130 provides the energy to power individual elements/components of the motive subsystem 140, the sensor subsystem 150, the communications subsystem 170 and the cleaning subsystem 180 and the circuits and components of the controller 160 via associated circuitry (not shown). The controller 160 comprises a microprocessor, memory and control circuitry for controlling and performing the various processes, modes and functions described herein for the robot 40, including estimating the likelihood of the robot 40 being capable of locating the base station 10, as described further below. The sensor subsystem 150 may comprise the front bumper 48, a front proximity sensor 49 (which may be any known optical or ultrasonic emitter and receiver arrays capable of detecting objects), one or more cliff-edge sensors 64 (which may be optical emitter/receiver sensors which are capable of detecting the floor) and wheel drop sensors.

The robotic device 40 may use a variety of modes to effectively vacuum a working area. A controller 160 on the robot 40 may identify and implement one or more of the modes for any given scenario, e.g., based upon inputs from the sensor system 150, a user input and/or based on a random selection. The controller 160 may also be operative to coordinate object avoidance and docking maneuvers with the base station 10.

Generally, the modes for the described robotic device 40 can be characterised as coverage modes and escape modes. Coverage modes may primarily allow the robotic device 40 to perform its operations in an efficient and effective manner, while an escape mode may be implemented when a signal from the sensor system indicates that normal operation of the robotic device 40 is impaired (e.g., obstacle encountered), or is likely to be impaired (e.g., drop-off detected).

Representative and illustrative coverage modes (for vacuuming) for the robotic device 40 include: (1) a spiral pattern; (2) a raster-scan pattern, and (3) a random zig-zag pattern. The spiral pattern may be implemented by means of a spiral algorithm (but other types of self-bounded area algorithms, such as polygonal, can be used). The spiral algorithm, which may cause outward or inward spiralling movement of the robotic device 40, is implemented by control signals from the controller 160 to the motive system 140 to change the turn radius/radii thereof as a function of time or distance travelled (thereby increasing/decreasing the spiral movement pattern of the robotic device 40).

The robotic device 40 may operate in the spiral pattern for a predetermined or random period of time, for a predetermined or random distance (e.g., a maximum spiral distance) and/or until the occurrence of a specified event, e.g., activation of one or more of the sensor subsystem 150 (collectively a transition condition). Once a transition condition occurs, the robotic device 40 can implement or transition to a different mode, e.g., the raster-scan pattern, the random zig-zag pattern, one of the escape modes, etc.

If the transition condition is the result of the robotic device 40 encountering an obstacle, the robotic device 40 can take other actions in lieu of transitioning to a different mode. The robotic device 40 can momentarily implement a mode to avoid or escape the obstacle and resume operation under control of the current algorithm (i.e., for spiral pattern, continue spiralling in the same direction). Alternatively, the robotic device 40 can momentarily implement a mode to avoid or escape the obstacle and resume operation under control of the current algorithm (e.g., but in the opposite direction—reflective spiralling).

The raster-scan pattern causes the robotic device 40 to clean in a raster-scan pattern. Initially, the robotic device 40 travels in a straight line (wheels operating at the same rotational speed in the same direction) until an obstacle is encountered or for a predetermined or random distance or time. The controller 160 may then implement a clockwise or counterclockwise turn of 90 degrees and then cause the robot 40 to travel a small straight-line distance (which, preferably, is equal to the length of the vacuum opening 60 or the diameter of the robot 40) and implements another turn in the same direction of 90 degrees before travelling again in a straight-line. Repetition of this behaviour causes the robot 40 to clean in a raster-scan pattern.

The random zig-zag pattern can be used by the robotic device 40 to clean a defined working area that is bounded by walls, stairs, obstacles or other barriers. Initially, the robotic device 40 travels in a straight line until an obstacle is encountered. The obstacle may be indicated by the front obstacle sensors or the front bumper. Upon activation of one or more of the sensor subsystem 150, the controller 160 may compute an acceptable range of new directions based upon the sensor that was activated. The controller 160 may select a new heading from within the acceptable range and implements a clockwise or counterclockwise turn to achieve the new heading with minimal movement. In some embodiments, the new turn heading may be followed by forward movement to increase the cleaning efficiency of the robotic device 40. The new heading may be randomly selected across the acceptable range of headings. In other embodiments of the random zig-zag mode, the controller 160 may be programmed to change headings randomly or at predetermined or random times/distances, without input from the sensor subsystem 150.

Certain embodiments of the robotic device 40 include a number of escape modes such as an edge mode, a wheel drop mode, and a stuck mode. One skilled in the art will appreciate that other modes can be utilised by the robotic device

40. One or more of these escape modes may be implemented, for example, in response to a current rise in one of the task components (indicating some sort of interference), a sensor response, or detection of a wheel-drop event.

In the edge mode, the controller reverses the direction of the main wheel drive assemblies 140 for a predetermined or random distance or time in response to detecting a cliff-edge via one or more of its cliff-edge sensors 64. The robot 40 may then turn to change its direction of travel away from the detected cliff-edge and continue operation in one of the coverage modes. This prevents the robot 40 from falling down a vertical drop such as steps.

Similarly, in the wheel drop mode, the controller 160 reverses the direction of the main wheel drive assemblies 140 for a predetermined or random distance or time in response to one or more of the wheel assemblies detecting a cliff-edge. This may be detected by, e.g., a reduction in the torque required to turn the wheels 56 (because it is no longer in contact with the ground as it is dangling over a cliff-edge), or decrease in the downward force applied to the wheel assembly (because it the wheel assembly is no longer carrying the weight of the robot) or any other suitable means. If the activated wheel drop sensor deactivates within a predetermined time, the controller 160 may then re-implement one of the coverage modes that was being executed prior to the activation of the wheel drop sensor.

In the stuck mode, the controller 160 reverses the direction of the main wheel drive assemblies 140 for a predetermined or random distance or time in response to detecting that that the robot has become stuck. The stuck mode frees the robotic device 40 from being stuck on surface impediments (e.g., high spot on carpet) or from being stuck under other obstacles (e.g., an overhang). The reversing of the wheel drive assemblies may be performed at a higher torque setting in order to enable the robot 40 to free itself from being stuck under an obstacle. In another example, if the robot 40 has detected that it has become stuck under an obstacle, the controller 160 may reverse the direction of the wheel assemblies 140 and, in addition, alternate the wheels that apply the reverse drive so that the robot 40 can move in a reciprocating manner to shimmy out from under the obstacle.

The foregoing description of typical modes for the robotic device 40 are intended to be representative of the types of operating modes that can be implemented by the robotic device 40. One skilled in the art will appreciate that the modes described above can be implemented in other combinations and other modes can be defined to achieve a desired result in a particular application.

Figure 4:
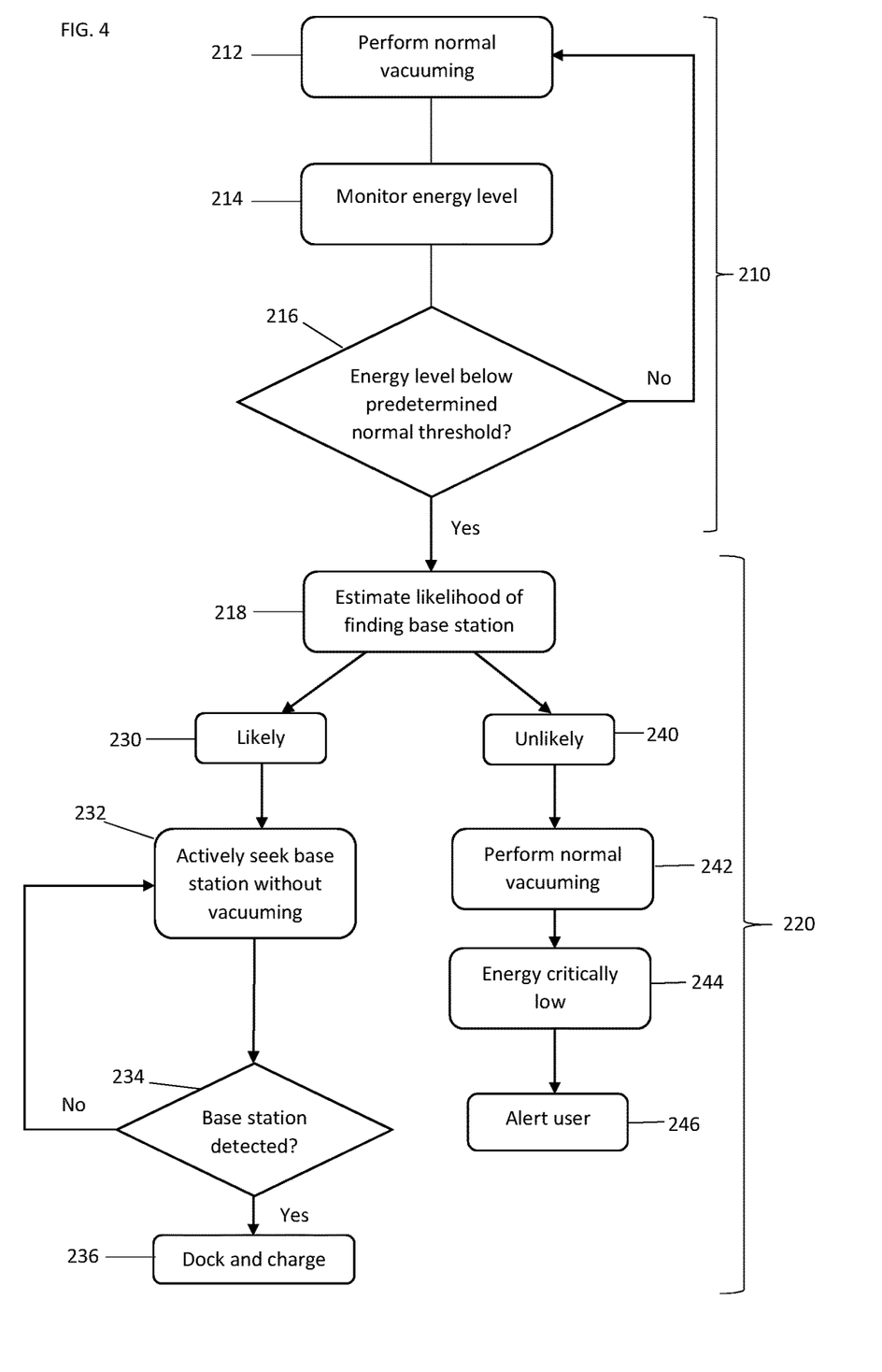
FIG. 4 shows an example process for the robotic device.

FIG. 4 depicts a schematic diagram which shows a control sequence performed by the controller 160 during vacuuming by the robot 40. Generally, the control sequence includes two subsequences based on the measured energy level of the robotic device 40. Those are referenced generally as a normal energy level 210 and a low energy level 220. In the normal energy level subsequence 210, the robotic device 40 performs its predetermined task, in this case, vacuuming (e.g., utilising the various modes described above) under normal operation 212.

During operation with a normal energy level 210, the robot 40 may "passively seek" the base station 10. While passively seeking the base station 10, the robot 40 does not alter its travel characteristics; rather, it continues about its normal mode until it fortuitously detects the base station 10. If the robot 40 detects the base station while passively seeking it, the robot 40 will continue about its normal operation but store information relating to the fact that the base station 10 had been detected. That information may, for example: be the number of times the base station had been detected during normal operation; be the times at which the base station has been detected; start a counter so as to measure the time elapsed since the base station was detected; start a distance measurement (e.g., using an odometer) so as to measure the distance travelled since the base station was detected; and/or any other suitable information. The robot 40 may passively seek the base station by listening for signals from the base station 10. Those signals may be, for example, an IR emission from the base station (e.g., from a front IR emitter array 20, if implemented) or, an RF signal from the base station 10 indicating that the robot's IR emission has been detected (e.g., if IR receivers are implemented in array 20).

During operation of the robot 40, the controller 160 continuously or periodically monitors the energy level 214 of the power subsystem 130. Various methods are available to monitor the energy level 214 of the power subsystem 130, such as coulometry (i.e., the measuring of current constantly entering and leaving the power source), or simply measuring voltage remaining in the power source. Other embodiments of the robotic device 40 may simply employ a timer and a look-up table stored in memory to determine how long the robotic device 40 can operate before it enters a different energy level subsequence. Still other embodiments may simply operate the robot 40 for a predetermined time period before entering the next energy level subsequence. If the robot 40 operates on a liquid or gaseous fuel, this level may also be measured with devices currently known in the art.

At step 216, the monitored energy level is compared with a predetermined normal threshold level. The predetermined normal threshold level, may be, for example, between 10-50% of the maximum capacity of the power subsystem. Preferably, the predetermined normal threshold level is set to a level between 20-35% of the maximum capacity of the power subsystem, or any other suitable implementation-specific level. If the monitored energy level is above the normal threshold level, then the robot 40 continues to perform normal vacuuming and the process returns to step 212. If the monitored energy level drops below the predetermined normal threshold level, the robot 40 enters a low energy level sequence 220 and the process moves on to step 218. At step 218, the controller 160 estimates a likelihood of the robot 40 being capable of locating the base station 10. The estimated likelihood may also take into account the remaining runtime of the robot 40 before the energy level falls below a critical level in which it does not have enough power to activate the motive subsystem 140. Based on the estimated likelihood, the process may move on to step 230 if it is considered that the robot is likely to find the base station or step 240 if it is considered that the robot is unlikely to find the base station.

The estimated likelihood may be based on one or more factors, such as:

a) Whether the robot 40 started its current cleaning operation from a base station 10 or not. If the robot 40 is activated or starts cleaning from the base station 10 then there is a good chance that the robot is still within the same operating area (e.g., same room or floor) as the base station and thus it is likely that the robot will be able to find the base station. However, if the robot 40 did not start its current cleaning operation from the base station 10 (e.g., because the user may have placed and started the robot in a different room or floor), then there is a lower chance of the base station 10 being in the same operating area as the robot 10 and so it is less likely that the robot 40 will be able to find the base station 10.

b) Whether the robot 40 detects a base station whilst on its current cleaning operation. If the robot 40 has detected the base station 10 (e.g., via the passive seeking described above), then it is likely that the robot 40 is within the operating area as the base station 10. However, if the robot 40 never detects the base station 10 during it current clean, then it is likely that the robot has moved to a different room (or was never in the same room/area in the first place) to the base station 10 and thus it is unlikely that the robot 40 will be able to locate the base station 10. The robot 40 may attempt to detect the base station 10 by pinging the base station 10. The ping message may be sent by the robot by any of the communications methods described herein. If the robot receives a response to the ping message from the base station 10, then it may determine that the base station 10 is available for the robot to dock. If, however, the robot 40 does not receive a response to the ping message from the base station 10, then it may be considered that there is a low chance of the robot 40 being capable of locating the base station 10. A non-response from the base station 10 may indicate issues such as the base station 10 has no power (e.g., because of a mains power-cut). Thus, even if the robot 40 is nearby the base station 40, a non-response may lead to the controller 160 to cause the robot 40 to ignore the base station 40 and maintain its predetermined task and not actively seek the base station 10.

c) The amount of time passed since the robot 40 last detected the base station 10. If the robot 40 has recently detected (e.g., in the last 5 minutes) the base station 10, then there is a good chance that the robot is still within the same room or area as the base station 10 and therefore it is likely to find the base station 10. However, as the amount of time increases since the base station was last detected, the chances that the robot has moved to another room or area will also increase. Thus, if the robot 40 has not detected the base station 10 for a long time, then it is less likely that it will be able to find the base station 10.

d) The distance travelled by the robot 40 since it last detected the base station 10. If the robot 40 has only travelled a short distance (e.g., less than 20 meters) since last detecting the base station 10, then there is a good chance that the robot 40 is still within the same room or area as the base station 10 and therefore it is likely to find the base station 10. However, as the distance travelled by the robot 40 increases since the base station 10 was last detected, the chances that the robot 10 has moved to another room or area will also increase. Thus, if the robot 40 has travelled a large distance since last detecting the base station 10, then it is less likely that it will be able to find the base station 10. In another example, the robot 40 may perform a known time-of-flight (or time-of-arrival) measurement to calculate the distance of the robot 40 from the base station 10. The calculated distance can then be used to determine the likelihood of the robot 40 being able to find the base station 10.

e) A comparison of parameters stored when the robot 10 was last docked at a base station 10. When the robot 40 is docked at the base station 10, it may sense various parameters of the local environment of the base station 10. For example, when docked at the base station 10, the controller 160 may enable the communications subsystem 170, which may comprise, e.g., a WiFi communication device, to detect which WiFi access points (APs) are within range of it whilst it is at the base station 10. The identifiers of the WiFi APs (e.g., the SSID) and signal strength of each of the APs can be determined and stored by the robot 40 for later comparison. After the robot 40 has begun cleaning and process reaches step 218, the controller 160 may cause the communications subsystem 170 to determine which APs are currently within range and compare those determined identifiers with the identifiers stored when the robot 40 was docked. If matching identifiers are found, then there is a good chance that the robot is still in the same room or area as the base station and so it is likely that the robot 40 will be able to locate the base station. If, however, none of the current identifiers match those that are stored then there is lower chance that the robot is in the same area/zone as the base station 10 and thus, it is unlikely that the robot will be able to locate the base station 10. The robot 40 may also be able to compare the detected signal strength of the APs with the stored signal strength of the same APs to determine its proximity to the base station 10. For example, when docked, AP-1 may have had a high signal strength and AP-2 had a low signal strength. After operating the robot 40 for some time and at step 218, the controller 160 may activate the Wi-Fi communications device to determine that AP-1 now has a low signal strength and AP-2 has a high signal strength. The controller 160 may infer from this that the robot 40 is now in a different room to AP-1, which was likely to be in the same room as the base station 10, and is now in the same room as AP-2 and thus it is unlikely to find the base station in sufficient time before the energy level of the robot becomes too low for it to move.

Other suitable factors may be used to estimate the likelihood of the robot being able to find a base station. For example, a robot may be provided with an altitude sensor (such as an altimeter) to detect changes in height. If a change in height is detected (e.g., because the user has moved the robot to a different floor), then the robot 40 may infer that it is no longer on the same floor as the base station 10 and thus it is unlikely to find the base station 10.

The controller 160 may classify the likelihood into a "likely" category 230 or an "unlikely" category 240. For example, if the robot has detected the base station within the last 10 minutes of operation, then the controller may classify the robot as being "likely" to find the base station because the base station 10 has recently been detected. Otherwise, the likelihood of finding the base station maybe classified as being "unlikely". A combination of one or more factors (such as the factors described above) may be used to determine the likelihood of finding the base station 10. For example, if the robot determines that it has not detected the base station recently (e.g., in the last 10 minutes) but it detects the same AP as the AP detected when docked, then the controller 160 may classify the robot as being "likely" to find the base station.

In another example, the controller 160 may determine a probability of the robot being able to find the base station. The probability may be calculated based one or more factors, such as the factors described above. If the probability is greater than a threshold amount, e.g., which may be a probability of between 50% and 60% or any other suitable implementation-specific level, then it may be considered that the robot is likely to find the base station 10, i.e., there is a high likelihood of the robot 40 being capable of finding the base station 10. If the probability is less than the threshold level, then it may be considered that the robot is unlikely to find the base station, i.e., there is a low likelihood of the robot 10 being capable of finding the base station 10. For example, the probability calculation may be based on a function of each of the above factors. E.g., the probability calculation may be based on a function of time elapsed and/or distance travelled since last detecting the base station. Each of the factors may have an appropriate weighting applied to it. The probability calculation used may differ for each implementation and may be dependent on the characteristics of the robot (e.g., its battery capacity, travelling speed, energy efficiency, the predetermined normal energy threshold used, etc).

The estimated likelihood may also take into account the remaining runtime of the robot 10. For example, the predetermined normal threshold level may be set such that the robot has 20 minutes of runtime remaining and so the estimated likelihood may be determined based on the robot being capable of finding the base station in 20 minutes.

If it is determined that the robot 40 is likely to find the base station, then the process moves on to step 230. At step 232, the robot 10 "actively seeks" the base station 10. While actively seeking the base station, the robot 40 may discontinue powering all incidental systems, and operations, such as vacuuming, allowing it to conserve as much energy as possible to increase its runtime and thus increase the chances of locating the base station 10. While actively seeking, the robot 40 may alter its travel characteristics to increase its chances of finding the base station 10. It may discontinue modes such as those employing a spiral movement, which do not necessarily create a higher chance of locating the base station, in favour of more deliberate modes, such as the raster-scan mode or a wall-following mode. This deliberate, active seeking will continue until the robot 40 detects the presence of the base station 10, as depicted at step 234. Other deliberate methods may also be used such as reconstructing the route the robot 40 has taken since last detecting the base station 10, searching for and following signals from APs known to be in the vicinity of the base station 10, enabling the RF communications with the base station and measuring the received signal strength from those communications to home into the base station 10, etc.

If the robot 40 detects the base station 10, e.g., at step 234, then the process moves on to step 236 where the robot 40 will dock with the base station 10 and recharge its batteries. Once the batteries have been recharged, the robot 40 may then wait for the next scheduled cleaning or, if it had not completed its previous cleaning task (e.g., a certain amount of cleaning time or distance), the robot 40 may undock with the base station 10 and resume vacuuming at step 212.

If it is determined at step 218 that the robot 40 is unlikely to find the base station 10, then the process moves on to step 240. At step 242, the robot 10 maintains its predetermined task, e.g., vacuuming, whilst passively seeking the base station 10. In other words, the robot 40 continuous about its normal vacuuming operation without actively seeking the base station, e.g., by operating in a similar manner as at step 212. As mentioned above, while passively seeking the base station 10, the robot 40 does not alter its travel characteristics; rather, it continues about its normal mode. If the robot 40 fortuitously detects the base station 10, then it will dock with the base station. However, if it does not detect the base station 10, then it will continue with its task, e.g., vacuuming, until its battery level reaches a critically low level where the robot is no longer able to travel or perform vacuuming, as depicted at step 244. As mentioned above, this has the advantage of usefully using the remaining low energy (i.e., the amount of energy below the predetermined normal level) for cleaning instead of wasting that energy looking for a base station 10 that is unlikely to be found by the robot 40 because, e.g., the base station 10 is not in the same area or room as the robot 40.

If, during the low energy level sequence 220, the robot 40 does not find the base station 10 and the battery drains to a critical level, the robot 40 may use its remaining energy to alert the user that its battery has drained and it is no longer able to travel or vacuum, as depicted at step 246. The alert may be, for example, a sound, a message to the user's smartphone (e.g., sent over a WiFi or a cellular network), a light pattern (e.g., flashing red light), or any other suitable method of alerting the user. The user may then place the robot 40 at the base station 10 for recharging. Steps 244 and 246 may also be performed when the robot's battery drains to the critical level while the robot 40 is actively seeking the base station 10 (at step 232).

The process described herein is particularly advantageous for robotic devices that move in a random fashion in a closed environment and do not perform route mapping or follow a predetermined route. Such route mapping and route following features usually increases the cost of the robot and thus may be undesirable in certain cases.

The process described herein allows robotic devices that move in a random fashion to utilise information gathered during cleaning and/or when docked to make an informed decision on how best to use its remaining energy when its battery power is low. That decision may be to actively seek a base station in order to recharge or to continue performing its given task in dependence on the observations made by the robot. This leads to an increase in the robot's capacity or runtime to perform its given task. For example, if the robot is able to recharge its batteries when low by finding the base station, then it can recharge and then continue performing its task autonomously without any human intervention. If, however, there is no base station accessible to the robot (e.g., because it is on another floor) or if there is a low chance of the robot finding the base station (e.g., because the robot and base station are in different rooms), then actively searching for the base station may be a futile exercise and a waste of the robot's remaining battery power. Thus, by making an informed decision to not actively seek the base station, the robot can use its remaining energy to instead continue performing its given task and thus improve its capacity to perform that task.

In scenarios where power cuts or other power failures occur whilst a robot is docked at a base station, some conventional robots mistakenly consider that it is no longer docked because it can no longer detect a charging voltage from the failed base station. Those robots then begin algorithms that cause the robot to look for the base station even though it is already docked. The robots then unknowingly move away from the base station to look for it. However, those robots will not be able to find the base station because it has failed and thus the robot unnecessarily wastes battery energy. A further embodiment of robot 40 is now described, which aims to solve this problem.

When the robot 10 is docked with the base station 10 and the base station 10 fails to provide energy (e.g., a voltage or current) to it's charging contacts 16 because of, e.g., an external power failure or an internal fault, the robot's charging contacts 54 will not detect a voltage (or current or any other energy) from the base station contacts 16. The controller 160 may then estimate a likelihood (e.g., by determining a probability) of the base station 10 being capable of providing energy to the robot 40 for recharging. The estimated likelihood may be based on one or more factors such as:

a) whether the robot 40 can detect the base station 10. The robot 40 may look/listen for signals from the base station 10, such as IR, RF or Wi-Fi signals that would normally be transmitted by the base station 10. If no such signals are detected by the robot 40, then there is a high likelihood that the base station 10 has failed.

b) whether the robot 40 can detect wireless communications devices. The robot 40 may comprise a wireless communications device, such as Wi-Fi, which may communicate with other devices such as access points (APs), as described above. If there is a power failure, those other device may have stopped operating along with the base station 10. Thus, if the robot 40 is no longer able to detect or communicate with those other devices, then there is a high likelihood that there is a power failure and so the base station 10 has failed.

c) Whether the robot has detected that it has been lifted off the base station 10. The robot 40 may determine if it has been lifted off the base statin 10 using the cliff-edge sensors 64, which can optically detect the presence of the floor, or using the wheel-drop sensors. If the robot 40 can no longer detect a voltage from the base station contacts 16 and it determines that it has not been lifted off the base station, then there is a high likelihood that the base station 10 has failed. If the robot 40 can no longer detect a voltage from the base station contacts 16 and the robot 40 determines that it has been lifted off the base station 10, then there is a low likelihood that there is a failure at the base station 10 (and it's likely that the robot 40 has been lifted and placed elsewhere by the user).

d) Whether the robot has been moved from the base station 10, e.g., by a user. The robot 40 may have been moved from the base station 10 by the user (e.g., intentionally or unintentionally kicked off the base station) and this movement can be detected by movement sensors such as accelerometers, wheel sensors, etc. If the robot 40 can no longer detect a voltage from the base station contacts 16 and it detects that it has not moved off the base station, then there is a high likelihood that the base station 10 has failed. If the robot 40 can no longer detect a voltage from the base station contacts 16 and the robot 40 detects that it has moved, then there is a low likelihood that there is a failure at the base station 10 (and it's likely that the robot 40 has been moved by the user). In this case, if the detection by the movement sensor is of a short, sharp movement then the robot 40 may determine that it has been unintentionally moved off the base station (e.g., unintentionally bumped by the user) and thus the robot 40 may then begin a docking routine to re-dock with the base station.

The robot 40 may then determine whether or not to seek the base station 10 based on the estimated likelihood. For example, if it's determined that it's unlikely that the base station 10 is able to charge the robot 10, then the robot 10 will not seek the base station 10 and may instead power down to conserve energy or begin a cleaning program (that does involve seeking of the base station). If it's determined that it's likely that the base station 10 is able to charge the robot 10, then the robot may seek the base station 10 or begin a cleaning program (that may involve seeking the base station). By estimating a likelihood of the base station 10 being capable of providing energy to the robot 40 and then deciding whether or not to seek the base station 10 based on that likelihood, the robot 10 is able to use it's battery energy more efficiently as it will not waste that energy looking for a base station that is not functional.

The robot of FIG. 3 is shown as comprising a number of functional blocks. This is schematic only and is not intended to define a strict division between different logic elements of such entities. Each functional block may be provided in any suitable manner. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system or robotic device may comprise one or more processors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A robotic device for performing a task, comprising:
   an energy storage device;
   a controller configured to determine a quantity of energy stored in the energy storage device,
   wherein if the controller determines that the quantity of energy stored is below a predetermined energy level, the controller estimates a likelihood of the robotic device being capable of locating a recharging base station, and in dependence on the estimated likelihood, the robotic device is configured to seek the base station or perform the task.

2. The robotic device of claim 1, wherein the controller estimates the likelihood of locating the base station based on at least one of whether the robotic device started its task at the base station, the robotic device detects the base station during performance of its task, the amount of time that has passed since the robotic device last detected the base station or the distance travelled since the robotic device last detected the base station.

3. The robotic device of claim 1, wherein the robotic device passively seeks the base station during the performance of its task.

4. The robotic device of claim 1, wherein one of the robotic device or base station has an IR or RF receiver for detecting signals from the other of the robotic device or base station.

5. The robotic device of claim 1, wherein if the controller determines that it is likely to find the base station, the controller directs the robotic device to stop performance of its task and actively seek the base station.

6. The robotic device of claim 1, wherein if the controller determines that it is unlikely to find the recharging base station, the robotic device will continue to perform it task and passively seek the base station.

7. The robotic device of claim 1, wherein the robotic device moves in a random fashion during the performance of its task.

* * * * *